United States Patent
Uezono et al.

(10) Patent No.: US 10,497,931 B2
(45) Date of Patent: Dec. 3, 2019

(54) METHOD OF MANUFACTURING LITHIUM ION SECONDARY BATTERY

(71) Applicant: TOYOTA JIDOSHA KABUSHIKI KAISHA, Toyota-shi, Aichi-ken (JP)

(72) Inventors: Tomoyuki Uezono, Okazaki (JP); Tomoya Mesuda, Nisshin (JP); Kunihiko Hayashi, Anjo (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/454,574

(22) Filed: Mar. 9, 2017

(65) Prior Publication Data
US 2017/0263918 A1    Sep. 14, 2017

(30) Foreign Application Priority Data
Mar. 14, 2016  (JP) ................. 2016-049168

(51) Int. Cl.
| | |
|---|---|
| H01M 4/136 | (2010.01) |
| H01M 10/0525 | (2010.01) |
| H01M 4/58 | (2010.01) |
| H01M 4/36 | (2006.01) |
| H01M 4/04 | (2006.01) |
| H01M 4/62 | (2006.01) |
| H01M 4/139 | (2010.01) |

(Continued)

(52) U.S. Cl.
CPC ......... *H01M 4/136* (2013.01); *H01M 4/0404* (2013.01); *H01M 4/0409* (2013.01); *H01M 4/364* (2013.01); *H01M 4/5825* (2013.01); *H01M 4/623* (2013.01); *H01M 10/0525* (2013.01); *B05D 5/12* (2013.01); *H01M 4/139* (2013.01); *H01M 4/1391* (2013.01); *H01M 4/62* (2013.01)

(58) Field of Classification Search
CPC ...... B05D 5/12; H01M 4/0404; H01M 4/136; H01M 4/364; H01M 4/5825; H01M 10/0525; H01M 4/62; H01M 4/139
USPC ......................................... 427/115
See application file for complete search history.

(56) References Cited

U.S. PATENT DOCUMENTS

| | | | |
|---|---|---|---|
| 2007/0026312 A1* | 2/2007 | Imachi | H01M 4/0404 429/217 |
| 2009/0181311 A1* | 7/2009 | Iwanaga | H01M 4/131 429/331 |
| 2009/0191460 A1 | 7/2009 | Fujiwara et al. | |

(Continued)

FOREIGN PATENT DOCUMENTS

| | | | |
|---|---|---|---|
| CN | 101964420 A | 2/2011 | |
| JP | 4778034 B2 | 7/2011 | |
| WO | WO-2014064513 A1 * | 5/2014 | ............ H01M 4/13 |

Primary Examiner — Brian K Talbot
(74) Attorney, Agent, or Firm — Sughrue Mion, PLLC

(57) ABSTRACT

A manufacturing method of a lithium ion secondary battery includes: forming a first mixture by mixing powder of a first electrode material, which is one of the active material and the conductive material, with powder of trilithium phosphate; forming a second mixture by mixing the first mixture with powder of a second electrode material which is the other one of the active material and the conductive material; forming a wet granulated body by mixing the second mixture with the binder and a solvent; and forming the active material layer by attaching the wet granulated body to the surface of the current collector foil.

6 Claims, 9 Drawing Sheets

(51) Int. Cl.
 *B05D 5/12* (2006.01)
 *H01M 4/1391* (2010.01)

(56) References Cited

U.S. PATENT DOCUMENTS

| | | | | |
|---|---|---|---|---|
| 2009/0286139 | A1* | 11/2009 | Awano | H01M 2/12 |
| | | | | 429/53 |
| 2011/0020708 | A1* | 1/2011 | Fujiki | H01M 4/366 |
| | | | | 429/231.95 |
| 2014/0346393 | A1* | 11/2014 | Park | H01M 4/131 |
| | | | | 252/182.1 |
| 2015/0052739 | A1* | 2/2015 | Deb | H01M 4/525 |
| | | | | 29/623.5 |
| 2016/0099461 | A1* | 4/2016 | Kishimoto | H01M 4/04 |
| | | | | 366/69 |

\* cited by examiner

COMPARATIVE EXAMPLE

COMPARATIVE EXAMPLE

METHOD OF MANUFACTURING LITHIUM ION SECONDARY BATTERY

INCORPORATION BY REFERENCE

The disclosure of Japanese Patent Application No. 2016-049168 filed on Mar. 14, 2016 including the specification, drawings and abstract is incorporated herein by reference in its entirety.

BACKGROUND

1. Technical Field

The present disclosure relates to a method of manufacturing a lithium ion secondary battery. More specifically, the disclosure relates to a method of manufacturing a lithium ion secondary battery in which trilithium phosphate ($Li_3PO_4$) is used as one of the materials for forming an active material layer of an electrode sheet.

2. Description of Related Art

In general, a lithium ion secondary battery has a configuration in which an electrode body, which includes positive and negative electrode sheets, and an electrolytic solution are accommodated in a battery case. In the electrode sheet, an active material layer is formed on a surface of a current collector foil. In addition, the active material layer is formed of electrode materials such as an active material or a binder. A method of manufacturing such an electrode sheet of a lithium ion secondary battery is disclosed in, for example, Japanese Patent No. 4778034.

Japanese Patent No. 4778034 describes a method of forming an active material layer on a current collector foil using a mixed powder which is prepared by mixing active material particles and a particulate binder with each other through a dry process. In addition, Japanese Patent No. 4778034 describes that a binder including a conductive material is used as the particulate binder. The conductive material is an electrode material which can form a conductive path between active material particles in the active material layer to improve the conductivity of the active material layer. Japanese Patent No. 4778034 describes that, by using the mixed powder not including a solvent to form the active material layer, a deviation of the electrode materials in a thickness direction of the active material layer can be prevented as compared to a case where a paste including a solvent is used.

SUMMARY

However, when a lithium ion secondary battery is charged and discharged, an electrolytic solution may be oxidized and decomposed to produce an acid. Further, the durability of the lithium ion secondary battery may deteriorate due to the acid produced by the oxidative decomposition of the electrolytic solution. Such deterioration in the durability of the battery can be prevented by using trilithium phosphate as one of the electrode materials for forming an active material layer. In order to appropriately prevent deterioration in the durability of a battery, it is preferable that trilithium phosphate is uniformly distributed in an active material layer.

In order to obtain an active material layer in which trilithium phosphate is uniformly distributed, it is necessary to form an active material layer using a mixture in which electrode materials including an active material, a conductive material, a binder, and trilithium phosphate are uniformly mixed with each other. Therefore, it is thought that a long period of time is required to mix the electrode materials with each other.

However, in a case where electrode materials are mixed with each other through a dry process for a long period of time as in the above-described technique in the related art, there is a problem in that active material particles and conductive material particles form a composite. Therefore, the amount of the conductive material contributing to the formation of a conductive path between the active material particles becomes insufficient, and input and output characteristics of a lithium ion secondary battery may deteriorate.

The disclosure is to provide a manufacturing method of a lithium ion secondary battery having excellent input and output characteristics in which trilithium phosphate is appropriately distributed in an active material layer of an electrode sheet.

According to a first aspect of the disclosure, there is provided a manufacturing method of a lithium ion secondary battery which includes an electrode sheet including an active material layer and a current collector foil, the active material layer including an active material, a conductive material, and a binder, and the current collector foil having a surface on which the active material layer is provided. The manufacturing method includes: forming a first mixture by mixing powder of a first electrode material, which is one of the active material and the conductive material, with powder of trilithium phosphate; forming a second mixture by mixing the first mixture with powder of a second electrode material which is the other one of the active material and the conductive material; forming a wet granulated body by mixing the second mixture with the binder and a solvent; and forming the active material layer by attaching the wet granulated body to the surface of the current collector foil.

In the manufacturing method of a lithium ion secondary battery, trilithium phosphate is appropriately dispersed in the first mixture. As a result, the second mixture can be formed within a short period of time. That is, a period of time required to form the second mixture by mixing the active material and the conductive material with each other through a dry process can be reduced. Accordingly, the formation of a composite of the active material and the conductive material can be prevented, and deterioration in the conductivity of the formed active material layer can be prevented. That is, a lithium ion secondary battery having a low internal resistance and excellent input and output characteristics can be manufactured. In addition, trilithium phosphate is appropriately dispersed in the first mixture. As a result, in the wet granulated body formed after the dispersion, trilithium phosphate can be appropriately dispersed. Thus, during the formation of the active material layer, the wet granulated body in which trilithium phosphate is appropriately dispersed is used. As a result, the active material layer in which trilithium phosphate is appropriately distributed can be formed.

In the above-described manufacturing method of a lithium ion secondary battery, the conductive material may be used as the first electrode material, and the active material may be used as the second electrode material. In general, the powders of the conductive material and trilithium phosphate are formed of fine particles having a smaller particle size than the powder of the active material and are difficult to disperse in the mixture. During the formation of the first mixture, the active material and the conductive material are not mixed with each other through a dry process and may not form a composite. Therefore, the mixing can be performed for a long period of time. During the formation of the first mixture, the conductive material, which is difficult to disperse, and trilithium phosphate are mixed with each other for a long period of time. As a result, the conductive material and trilithium phosphate can be uniformly dispersed in the first mixture. Further, even in a case where the mixing time during the formation of the second mixture is short, the second mixture in which the active material is uniformly dispersed in the first mixture can be obtained. As a result, in the wet granulated body formed after the formation of the second mixture, the materials can be more uniformly dispersed. Thus, by using the wet granulated body, the active material layer in which trilithium phosphate is more appropriately distributed can be formed.

In the above-described manufacturing method of a lithium ion secondary battery, when forming the first mixture, the powder of the first electrode material may be mixed with the powder of trilithium phosphate by rotating a stirring blade at a circumferential speed of 20 m/sec or faster for 15 sec or longer. As a result, trilithium phosphate can be more uniformly dispersed in the first mixture. Further, in the wet granulated body formed after the dispersion, trilithium phosphate can be more uniformly dispersed. Thus, by using the wet granulated body, the active material layer in which trilithium phosphate is more appropriately distributed can be formed.

In the above-described manufacturing method of a lithium ion secondary battery, the active material may be used as the first electrode material, and the conductive material may be used as the second electrode material.

In the above-described manufacturing method of a lithium ion secondary battery, the first mixture and the second mixture may be formed by performing the mixing through a dry process.

In the above-described manufacturing method of a lithium ion secondary battery, when forming the wet granulated body, a first stirring and a second stirring may be performed, the first stirring may be performed by rotating a stirring blade at a predetermined circumferential speed and the second stirring may be performed by rotating the stirring blade at a faster circumferential speed than in the first stirring.

In the above-described manufacturing method of a lithium ion secondary battery, the solvent may be mixed with the second mixture such that a ratio of a weight of a solid content to a total weight of the wet granulated body is 65% to 95%.

In the above-described manufacturing method of a lithium ion secondary battery, the binder may be polyvinylidene fluoride, and the solvent may be N-methylpyrrolidone.

According to the disclosure, a manufacturing method of a lithium ion secondary battery can having excellent input and output characteristics can be provided in which trilithium phosphate is appropriately distributed in an active material layer of an electrode sheet.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, embodiments of the disclosure will be described in detail with reference to the drawings.

First Embodiment

Figure 1:
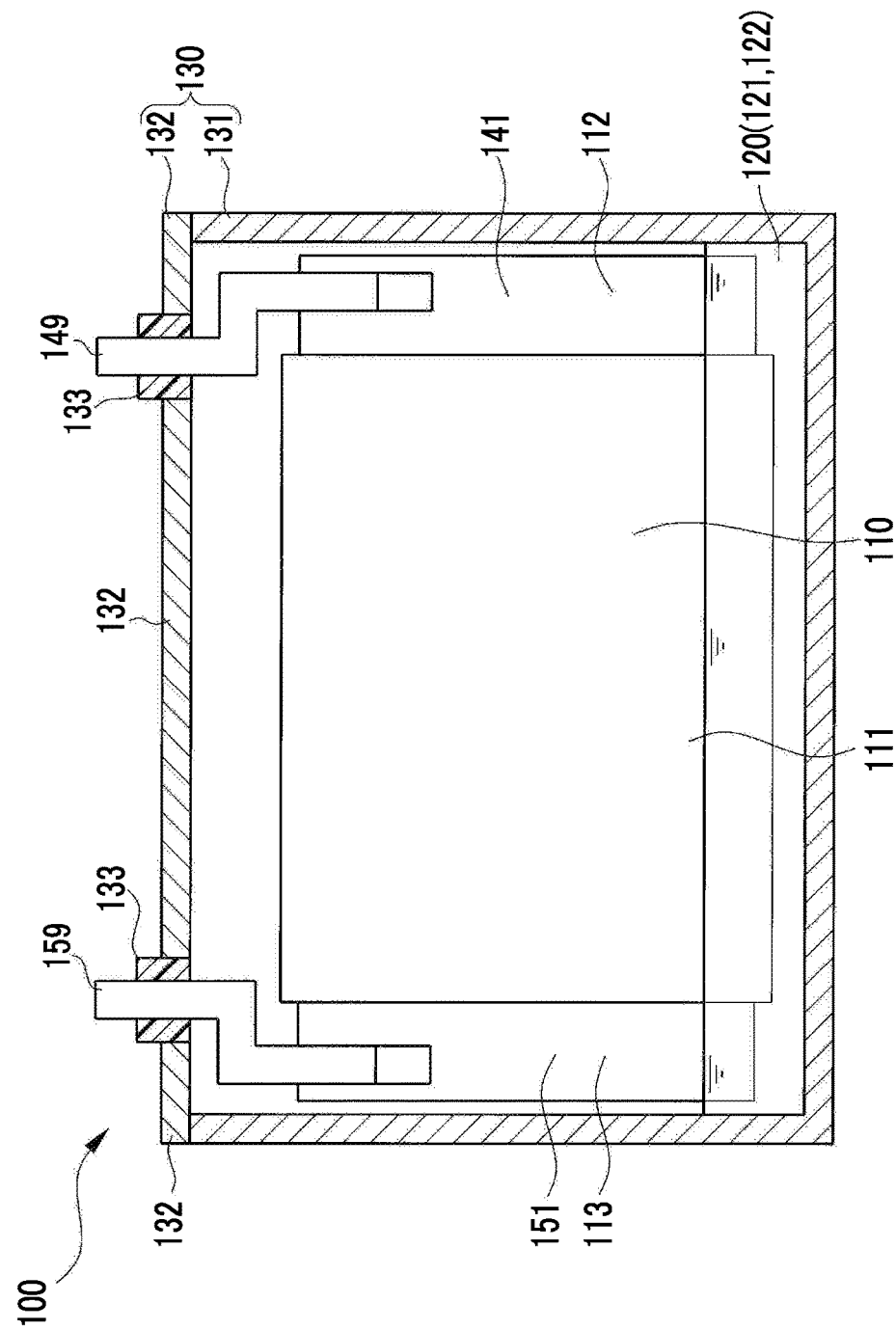
FIG. 1 is a diagram showing a schematic configuration of a battery.

First, a battery 100 (refer to FIG. 1) which is manufactured using a method according to the embodiment will be described. FIG. 1 is a diagram showing a schematic configuration of the battery 100 according to the embodiment. As shown in FIG. 1, the battery 100 is a lithium ion secondary battery in which an electrode body 110 and an electrolytic solution 120 are accommodated in a battery case 130. The battery case 130 includes a case body 131 and a sealing plate 132. The sealing plate 132 includes an insulating member 133.

The electrolytic solution 120 according to the embodiment is a nonaqueous electrolytic solution in which an electrolyte 122 is dissolved in a nonaqueous solvent 121. As the nonaqueous solvent 121 of the electrolytic solution 120, for example, an organic solvent such as ethylene carbonate (EC), ethyl methyl carbonate (EMC), or dimethyl carbonate (DMC) can be used.

In the electrolytic solution 120 according to the embodiment, as the electrolyte 122, lithium hexafluorophosphate ($LiPF_6$) which is an ionic compound including fluorine is used. That is, the electrolytic solution 120 is a nonaqueous electrolytic solution that includes an ionic compound including fluorine.

Figure 2:
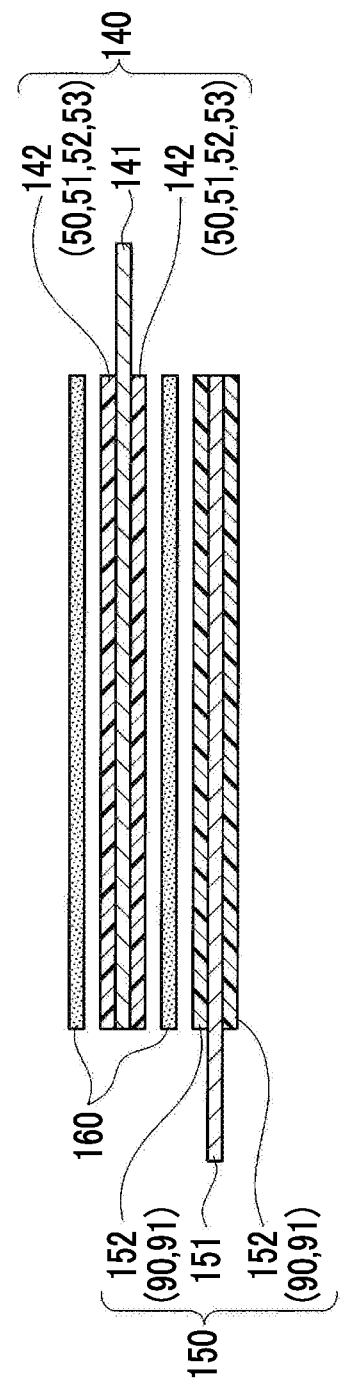
FIG. 2 is a sectional view showing a positive electrode sheet and the like constituting an electrode body.

FIG. 2 is a sectional view showing a positive electrode sheet 140, a negative electrode sheet 150, and separators 160 that constitute the electrode body 110. All of the positive electrode sheet 140, the negative electrode sheet 150, and the separators 160 have an elongated sheet shape. FIG. 2 is a sectional view showing the positive electrode sheet 140 and the like in a width direction with respect to a longitudinal direction. The electrode body 110 is obtained by laminating the positive electrode sheet 140, the negative electrode sheet 150, and the separators 160 as shown in FIG. 2 and winding the obtained laminate in a flat shape in a winding axial direction which is the width direction.

As shown in FIG. 2, in the positive electrode sheet 140, a positive electrode active material layer 142 is formed on both surfaces of a positive electrode current collector foil 141. As the positive electrode current collector foil 141, for example, an aluminum foil can be used. The positive electrode active material layer 142 according to the embodiment includes an active material 50, a conductive material 51, a binder 52, and trilithium phosphate (Li$_3$PO$_4$) 53. Hereinafter, trilithium phosphate will also be referred to as LPO.

The active material 50 is a material contributing to the charging and discharging of the battery 100 and can store and release lithium ions. As the active material 50, for example, LiNi$_{1/2}$Mn$_{3/2}$O$_4$ can be used. The conductive material 51 can improve the conductivity of the positive electrode active material layer 142. As the conductive material 51, for example, acetylene black (AB) can be used.

The binder 52 binds the materials, which are included in the positive electrode active material layer 142, to each other to form the positive electrode active material layer 142, and can also bind the positive electrode active material layer 142 to a surface of the positive electrode current collector foil 141. As the binder 52, for example, polyvinylidene fluoride (PVDF) can be used. The LPO 53 is a material which prevents the durability of the battery 100 from deteriorating due to an acid produced by the oxidative decomposition of the electrolytic solution 120.

As shown in FIG. 2, in the negative electrode sheet 150, a negative electrode active material layer 152 is formed on both surfaces of a negative electrode current collector foil 151. As the negative electrode current collector foil 151, for example, a copper foil can be used. The negative electrode active material layer 152 according to the embodiment includes an active material 90 and a binder 91.

The active material 90 is a material contributing to the charging and discharging of the battery 100 and can store and release lithium ions. As the active material 90, for example, natural graphite can be used. The binder 91 binds the materials, which are included in the negative electrode active material layer 152, to each other to form the negative electrode active material layer 152, and can also bind the negative electrode active material layer 152 to a surface of the negative electrode current collector foil 151. As the binder 91, for example, styrene-butadiene rubber (SBR) can be used.

The separator 160 is a porous sheet having plural pores. As the separator 160, for example, polypropylene (PP) or polyethylene (PE) can be used alone. Alternatively, a composite material in which the above examples are laminated can be also used as the separator 160.

As shown in FIG. 2, the positive electrode sheet 140 has a portion where the positive electrode current collector foil 141 is exposed without the positive electrode active material layer 142 being formed. The negative electrode sheet 150 has a portion where the negative electrode current collector foil 151 is exposed without the negative electrode active material layer 152 being formed. In the wound electrode body 110 shown in FIG. 1, a positive electrode end portion 112 consists of only the exposure portion of the positive electrode sheet 140 where the positive electrode current collector foil 141 is exposed. In the electrode body 110, a negative electrode end portion 113 consists of only the exposure portion of the negative electrode sheet 150 where the negative electrode current collector foil 151 is exposed.

Further, as shown in FIG. 1, a positive electrode terminal 149 is connected to the positive electrode end portion 112 of the electrode body 110. A negative electrode terminal 159 is connected to the negative electrode end portion 113 of the electrode body 110. Respective ends of the positive electrode terminal 149 and the negative electrode terminal 159 which are not connected to the electrode body 110 protrude to the outside of the battery case 130 through the insulating member 133.

On the other hand, at a center portion 111 of the electrode body 110 in FIG. 1, a portion of the positive electrode sheet 140 where the positive electrode active material layer 142 is formed and a portion of the negative electrode sheet 150 where the negative electrode active material layer 152 is formed are laminated with the separators 160 interposed therebetween as shown in FIG. 2. The battery 100 is charged and discharged at the center portion 111 of the electrode body 110 through the positive electrode terminal 149 and the negative electrode terminal 159.

Next, a method of manufacturing the battery 100 according to the embodiment will be described. The battery 100 according to the embodiment is manufactured by winding the positive electrode sheet 140 and the negative electrode sheet 150, together with the separators 160 to prepare the electrode body 110, and accommodating the electrode body 110 and the electrolytic solution 120 in the battery case 130. In addition, the method of manufacturing the battery 100 according to the embodiment is characterized in the manufacturing of the positive electrode sheet 140. Specifically, the method of manufacturing the battery 100 according to the embodiment is characterized in a method of manufacturing a material which forms the positive electrode active material layer 142 of the positive electrode sheet 140. Therefore, hereinafter, steps of manufacturing the positive electrode sheet 140 will be described in detail.

Figure 3:
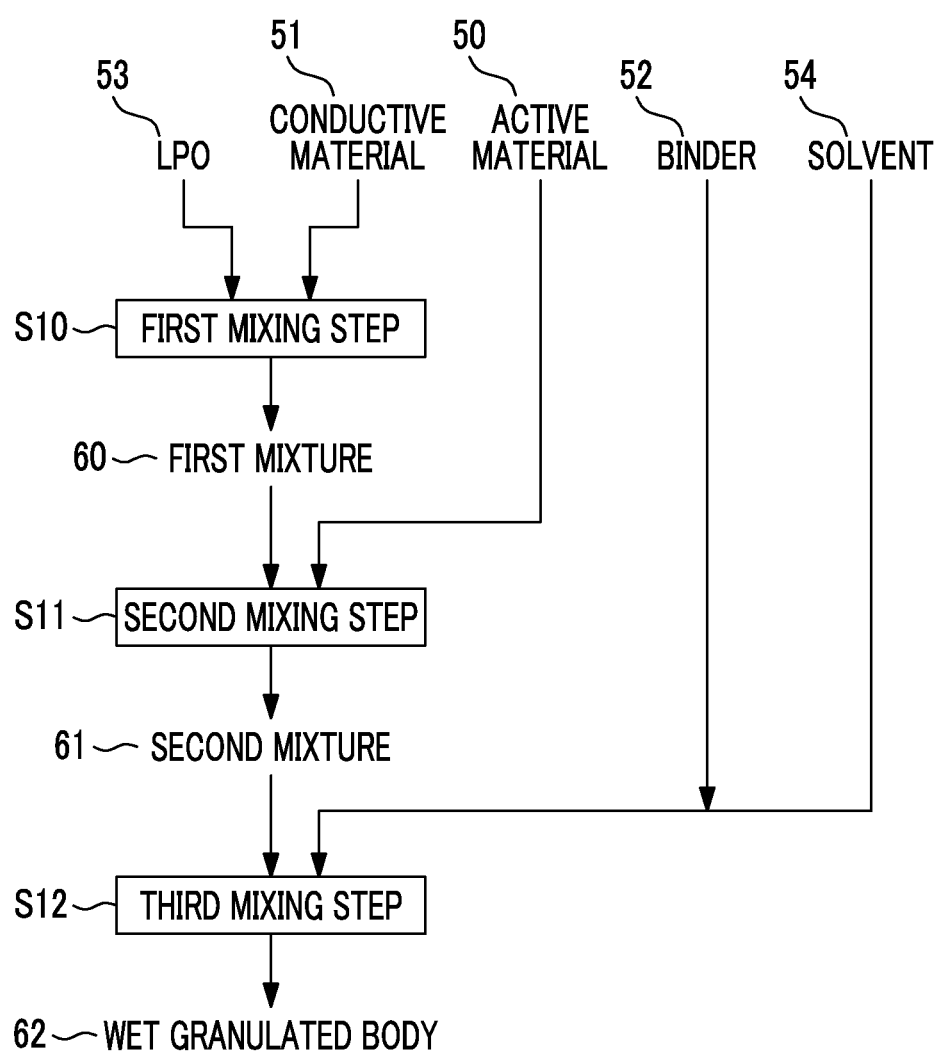
FIG. 3 is a flowchart showing the procedure of forming a wet granulated body according to a first embodiment.

The positive electrode sheet 140 according to the embodiment is manufactured through a film forming step including: forming a wet granulated body 62 in the procedure shown in FIG. 3; and forming the positive electrode active material layer 142 on a surface of the positive electrode current collector foil 141 using the wet granulated body 62. That is, the wet granulated body 62 is used to form the positive electrode active material layer 142 of the positive electrode sheet 140. Therefore, in order to form the wet granulated body 62, as shown in FIG. 3, the active material 50, the conductive material 51, the binder 52, and the LPO 53, which are positive electrode materials constituting the positive electrode active material layer 142, are used. In addition, as shown in FIG. 3, not only the positive electrode materials but also a solvent 54 are used to form the wet granulated body 62. As the solvent 54, for example, N-methylpyrrolidone (NMP) can be used.

In the embodiment, the wet granulated body 62 is formed by performing a first mixing step (S10), a second mixing step (S11), and a third mixing step (S12) shown in FIG. 3 using the active material 50, the conductive material 51, the binder 52, the LPO 53, and the solvent 54.

Figure 4:
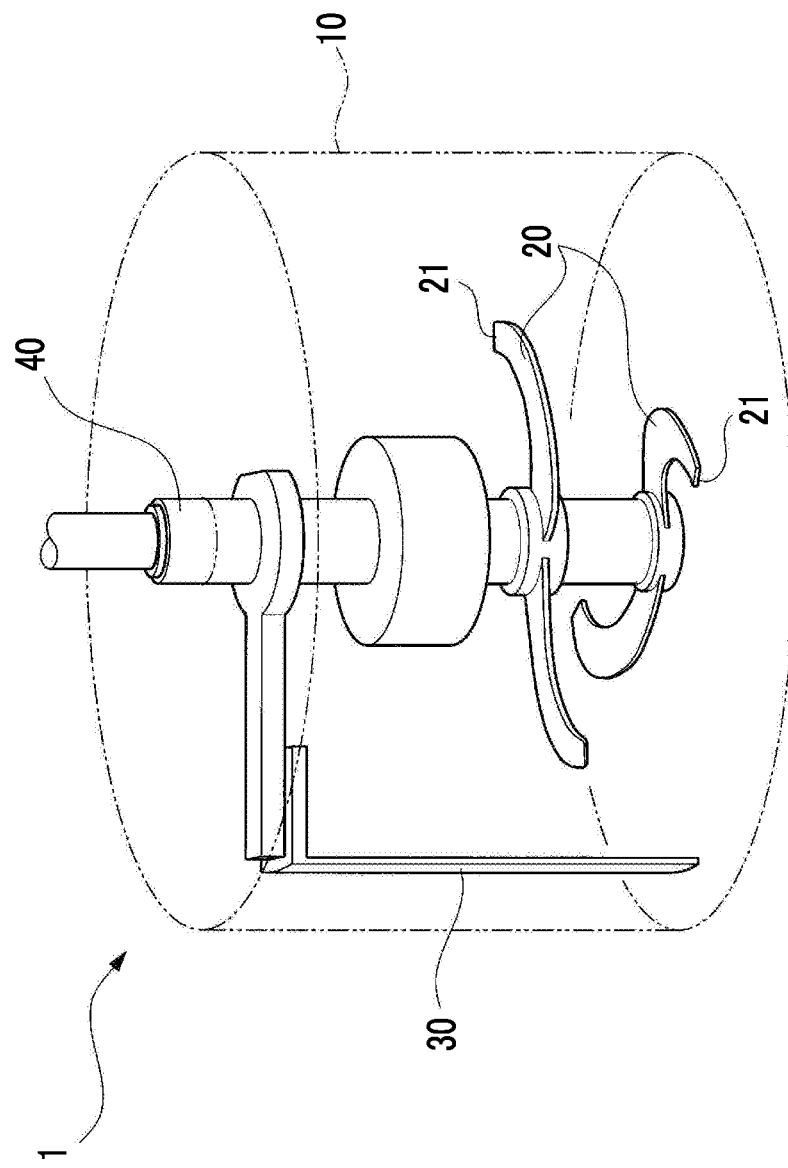
FIG. 4 is a diagram showing a schematic configuration of a stirring device.

That is, first, as shown in FIG. 3, the first mixing step (S10) is performed using the conductive material 51 and the LPO 53. In the first mixing step, a stirring device 1 shown in FIG. 4 can be used. The stirring device 1 includes a stirring blade 20 and a scraper 30 which are provided in a stirring tank 10 and are fixed to a driving shaft 40. In the stirring device 1, two stirring blades 20 are provided. In addition, in FIG. 4, tip ends 21 of the stirring blade 20 are shown.

The stirring blades 20 and the scraper 30 are rotated around the driving shaft 40 as a rotation axis. By the stirring blades 20 being rotated, the stirring device 1 can stir materials which are put into the stirring tank 10. The scraper 30 can prevent the materials in the stirring tank 10 from being attached to an inner wall surface of the stirring tank 10.

In the first mixing step, powder of the conductive material 51 and powder of the LPO 53 are put into the stirring tank 10 of the stirring device 1 and are stirred. That is, the first mixing step according to the embodiment is performed through a dry process. Due to this stirring, the conductive material 51 and the LPO 53 are uniformly stirred, and thus a first mixture 60 is manufactured as shown in FIG. 3. Therefore, the first mixture 60 is obtained by uniformly mixing the conductive material 51 and the LPO 53 with each other.

The powder of the conductive material 51 is formed of aggregated particles which are formed by aggregation of plural primary particles of AB. Specifically, the aggregated particles in the powder of the conductive material 51 have a structure in which plural primary particles of AB are linked in a disordered chain or tufted shape. In addition, the aggregated particles in the powder of the conductive material 51 before the first mixing step are coarse. In the first mixing step, a portion of the linkage in the structure of the aggregated particles of the conductive material 51 is cut such that the aggregated particles of the conductive material 51 can be made to have an appropriate size which is suitable for forming the positive electrode active material layer 142. As a result, in the first mixing step, the aggregated particles of the conductive material 51 in the first mixture 60 are crushed into a size which is smaller than that before the first mixing step.

Next, as shown in FIG. 3, the second mixing step (S11) is performed. In the second mixing step, the first mixture 60 is mixed with the active material 50. In the embodiment, the stirring device 1 can also be used in the second mixing step. That is, powder of the active material 50 is put into the stirring tank 10 of the stirring device 1 after the first mixing step, and the components are stirred. That is, in the embodiment, the second mixing step is also performed through a dry process.

In the second mixing step, the first mixture 60 and the active material 50 are uniformly mixed with each other to manufacture a second mixture 61. Therefore, the second mixture 61 includes the active material 50, the conductive material 51, and the LPO 53. The second mixture 61 is formed by uniformly mixing the active material 50, the conductive material 51, and the LPO 53 with each other.

Next, as shown in FIG. 3, the third mixing step (S12) is performed. In the third mixing step, the second mixture 61 is mixed with the binder 52 and the solvent 54. In the embodiment, the stirring device 1 can also be used in the third mixing step. That is, the binder 52 and the solvent 54 are put into the stirring tank 10 of the stirring device 1 after the second mixing step, and the components are stirred. In the embodiment, a binder solution in which the binder 52 and the solvent 54 are mixed with each other in advance is put into the stirring device 1. That is, the third mixing step is performed through a wet process in which the solvent 54 is used.

In the third mixing step, the second mixture 61, the binder 52, and the solvent 54 are uniformly mixed with each other to form the wet granulated body 62. Therefore, the wet granulated body 62 includes the active material 50, the conductive material 51, the binder 52, the LPO 53, and the solvent 54 which are uniformly mixed with each other.

In the third mixing step, low-speed stirring and high-speed stirring are performed. Specifically, first, low-speed stirring is performed for a given time after the binder solution is put into the stirring tank 10. Due to this low-speed stirring, the second mixture 61 and the binder solution are mixed with each other. As a result, the active material 50, the conductive material 51, the binder 52, the LPO 53, and the solvent 54 are mixed with each other in the mixture. In addition, during the low-speed stirring, particles of the positive electrode materials (the active material 50, the conductive material 51, the binder 52, and the LPO 53) are attached to each other to form a wet granulated body having coarse particles.

In addition, after the low-speed stirring, the high-speed stirring is performed at a faster circumferential speed of the stirring blades 20 than in the low-speed stirring. In the embodiment, the circumferential speed of the stirring blade 20 is a speed at which the tip ends 21 of the stirring blades 20 are rotated. Due to the high-speed stirring, the wet granulated body having coarse particles which is formed by the low-speed stirring is crushed to obtain the wet granulated body 62 having fine particles. As a result, in the third mixing step, the wet granulated body 62 having an appropriate particle size for forming the positive electrode active material layer 142 is formed.

It is preferable that a solid content ratio in the wet granulated body 62 is 65% or higher. That is, it is preferable that the amount of the solvent 54 is adjusted such that a ratio of the weight of a solid content (positive electrode materials) to the total weight of the wet granulated body 62 is 65% or higher. In the above-described range, the amount of the solvent 54 is not excessive, and the wet granulated body 62 can be appropriately formed. It is preferable that the solid content ratio in the wet granulated body 62 is 95% or lower. The reason for this is as follows. In the above-described range, the amount of the solvent 54 is sufficient, and the wet granulated body 62 can be appropriately formed.

Figure 5:
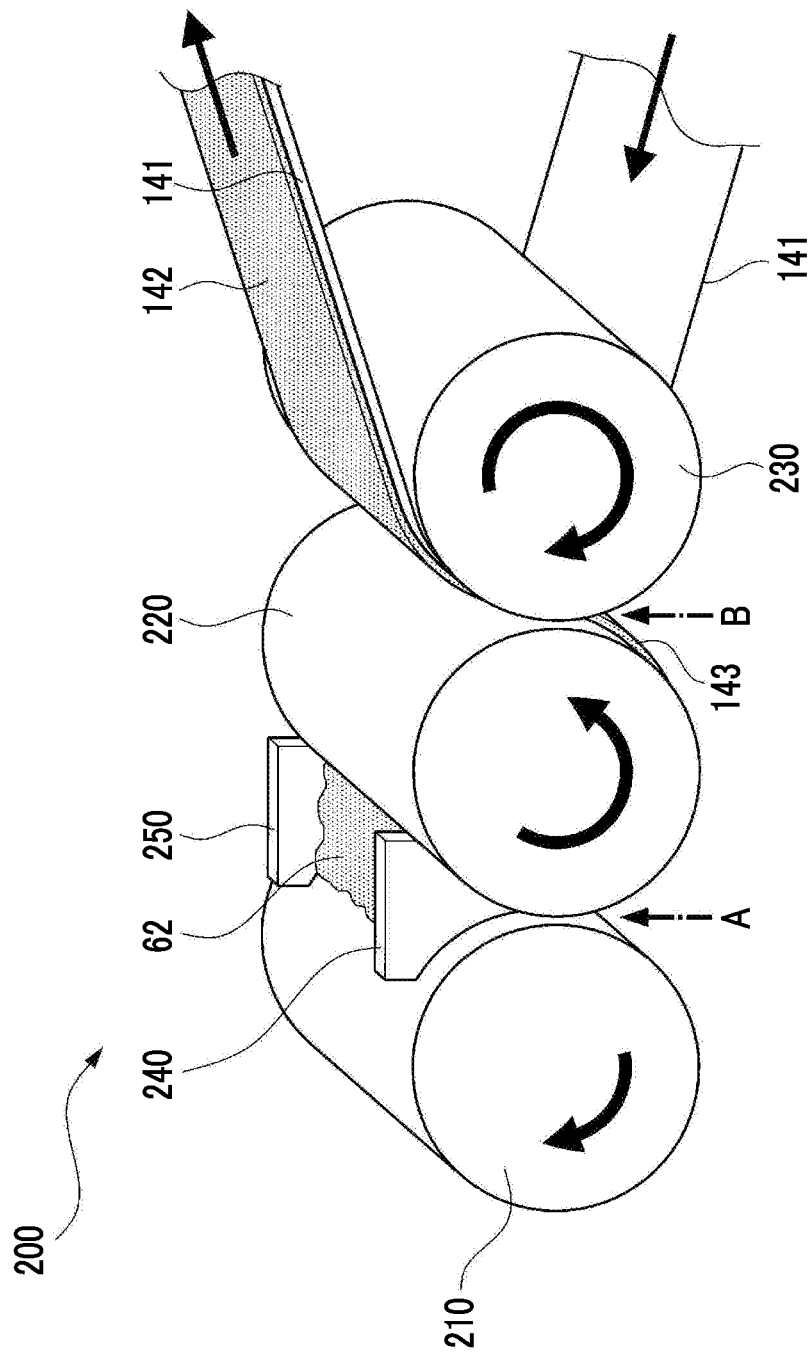
FIG. 5 is a diagram showing a schematic configuration of a film forming device.

The film forming step is performed using the wet granulated body 62 obtained as described above. In the film forming step, the wet granulated body 62 is attached to the surface of the positive electrode current collector foil 141 to form the positive electrode active material layer 142. As a result, in the film forming step, the positive electrode sheet 140 is manufactured. In the film forming step, a film forming device 200 shown in FIG. 5 can be used. The film forming device 200 includes a first roll 210, a second roll 220, and a third roll 230. As shown in FIG. 5, in the film forming device 200, these three rolls are disposed in parallel.

The first roll 210 and the second roll 220 are a pair of rolls whose outer circumferential surfaces face each other at a first facing position A. The second roll 220 and the third roll 230 are a pair of rolls whose outer circumferential surfaces face each other at a second facing position B. At each of the first facing position A and the second facing position B, a gap is provided between the rolls facing each other.

In a region above the first facing position A, partition plates 240, 250 are provided near opposite ends of the first roll 210 and the second roll 220 in the axial direction. That is, the partition plates 240, 250 are disposed at a distance from each other. The wet granulated body 62 is put into a gap between the partition plates 240, 250.

At the second facing position B, the positive electrode current collector foil 141 is wound around the outer circumferential surface of the third roll 230. That is, the positive electrode current collector foil 141 passes through a gap between the second roll 220 and the third roll 230 at the second facing position B.

The film forming step is performed by rotating the first roll 210, the second roll 220, and the third roll 230 of the film forming device 200 in predetermined directions indicated by arrows in FIG. 5, respectively. Specifically, both the first roll 210 and the second roll 220 rotate such that moving directions of the outer circumferential surfaces thereof at the first facing position A face downward with respect to a vertical direction.

The third roll 230 rotates such that a moving direction of the outer circumferential surface thereof at the second facing position B is the same as the moving direction of the outer circumferential surface of the second roll 220. In addition, by the third roll 230 rotating, the positive electrode current collector foil 141 wound around the third roll 230 is transported as indicated by the arrow in FIG. 5.

In the film forming step, the wet granulated body 62 provided between the partition plates 240, 250 passes through the gap between the first roll 210 and the second roll 220 at the first facing position A along with the rotations of the first roll 210 and the second roll 220. When passing through the gap at the first facing position A, the wet granulated body 62 is pressed and rolled by the first roll 210 and the second roll 220. Due to this rolling, the wet granulated body 62 is formed into a sheet shape at the first facing position A to obtain an electrode mixture sheet 143.

Here, in the film forming device 200 according to the embodiment, a circumferential speed of the second roll 220 is faster than a circumferential speed of the first roll 210. That is, at the first facing position A, a moving speed of the outer circumferential surface of the second roll 220 is faster than a moving speed of the outer circumferential surface of the first roll 210. As a result, the electrode mixture sheet 143 formed at the first facing position A is attached to the outer circumferential surface of the second roll 220 at a faster moving speed.

The electrode mixture sheet 143 which is held by being attached to the outer circumferential surface of the second roll 220 is transported along with the rotation of the second roll 220 so as to reach the second facing position B. The electrode mixture sheet 143 which has reached the second facing position B passes through the gap between the second roll 220 and the third roll 230 at the second facing position B along with the positive electrode current collector foil 141. While passing through the gap at the second facing position B, the electrode mixture sheet 143 and the positive electrode current collector foil 141 are pressed by the second roll 220 and the third roll 230 in the thickness direction.

Here, in the film forming device 200 according to the embodiment, a circumferential speed of the third roll 230 is faster than a circumferential speed of the second roll 220. That is, at the second facing position B, a moving speed of the outer circumferential surface of the positive electrode current collector foil 141 is faster than a moving speed of the outer circumferential surface of the second roll 220. As a result, the electrode mixture sheet 143 which has been pressed in the thickness direction at the second facing position B is transferred and attached to the surface of the positive electrode current collector foil 141 at a faster moving speed. The electrode mixture sheet 143 attached to the surface of the positive electrode current collector foil 141 is the positive electrode active material layer 142.

Therefore, the positive electrode active material layer 142 is formed on one surface of the positive electrode current collector foil 141 having passed through the second facing position B. After passing through the second facing position B, the positive electrode current collector foil 141 on which the positive electrode active material layer 142 is formed is discharged by the film forming device 200. Further, the positive electrode active material layer 142 can also be formed on the other surface of the positive electrode current collector foil 141. Therefore, in the film forming step, the positive electrode sheet 140 can be manufactured by forming the positive electrode active material layer 142 on both surfaces of the positive electrode current collector foil 141.

In addition, after the film forming step, the positive electrode sheet 140 is wound together with the negative electrode sheet 150 and the separators 160. Due to this winding, the electrode body 110 can be manufactured. Further, by accommodating the electrode body 110 in the battery case 130 together with the electrolytic solution 120, the battery 100 according to the embodiment can be manufactured (FIG. 1).

Before the positive electrode sheet 140 is incorporated into the electrode body 110, a drying step of drying the positive electrode active material layer 142 may be performed. Further, in order to adjust the density of the positive electrode active material layer 142, a pressing step of pressing the positive electrode sheet 140 in the thickness direction may be performed.

Here, in the mixing step of forming the wet granulated body, it is preferable that a period of time required to mix the active material and the conductive material with each other through a dry process is shortened. The reason for this is as follows. In a case where the active material and the conductive material are mixed with each other through a dry process for a long period of time, the active material and the conductive material may form a composite. When the active material and the conductive material are mixed with each other through a dry process, particles of the active material and particles of the conductive material are strongly pressed against each other.

In a case where a composite of the active material and the conductive material is formed, a large amount of the conductive material is present on the surface of the active material in the wet granulated body. That is, even in the positive electrode active material layer which is formed using the wet granulated body, a large amount of the conductive material is present on the surface of the active material. Therefore, the amount of the conductive material contributing to the formation of a conductive path between the active material particles in the positive electrode active material layer may be insufficient. As a result, in a case where the active material and the conductive material are mixed with each other through a dry process for a long period of time, the formation of a conductive path between the active material particles in the positive electrode active material layer is not favorable, and thus the internal resistance of the battery increases.

On the other hand, in the embodiment, the wet granulated body is formed in the procedure shown in FIG. 3. That is, in the embodiment, the first mixing step is performed before the second mixing step. In the first mixing step, the conductive material and the LPO are mixed to manufacture the first mixture in which the conductive material and the LPO are uniformly mixed. That is, before the second mixing step, the first mixture in which the conductive material and the LPO are uniformly mixed is prepared.

Therefore, in the embodiment, after the first mixing step, the second mixing step of mixing the first mixture and the active material with each other can be performed within a short period of time. Since the conductive material and the LPO are uniformly mixed with each other in the first mixture, the first mixture and the active material can be uniformly mixed with each other within a short period of time. In the embodiment, by performing the second mixing step of mixing the active material and the conductive material through a dry process within a short period of time, the formation of a composite between the active material and the conductive material can be prevented.

As a result, in the embodiment, the amount of the conductive material contributing to the formation of a conductive path between the active material particles in the positive electrode active material layer can be made to be sufficient, and a conductive path can be favorably formed between the active material particles. Therefore, in the embodiment, the internal resistance of the manufactured battery can be reduced. Accordingly, the battery having excellent input and output characteristics can be manufactured.

In addition, in the embodiment, the first mixture is manufactured by uniformly mixing the conductive material and the LPO with each other in the first mixing step. That is, in the first mixing step, the LPO is uniformly dispersed in the first mixture. Therefore, after the first mixing step, the LPO is also uniformly dispersed in the second mixture manufactured in the second mixing step and in the wet granulated body formed in the third mixing step. Further, the LPO is also uniformly distributed in the positive electrode active material layer which is formed using the wet granulated body.

Therefore, even in a case where hydrofluoric acid (HF) is produced by the oxidative decomposition of the electrolytic solution which is caused when the potential of the positive electrode sheet is high during the charging of the battery, the produced hydrofluoric acid reacts with the LPO, which is uniformly distributed in the positive electrode active material layer, so as to be appropriately handled. The reason for this is that the reaction frequency of the hydrofluoric acid and the LPO can be improved. For example, the elution of transition metal of the active material in the positive electrode active material layer caused by the hydrofluoric acid can be prevented. In addition, for example, the separators provided between the positive electrode sheet and the negative electrode sheet can be prevented from being damaged by the hydrofluoric acid. As a result, the LPO prevents deterioration in the durability of the battery.

Accordingly, using the method according to the embodiment, the lithium ion secondary battery having excellent input and output characteristics in which the LPO is appropriately distributed in the active material layer of the positive electrode sheet can be manufactured.

Further, in the embodiment, the second mixing step of mixing the active material and the conductive material with each other through a dry process is performed within a short period of time. As a result, the positive electrode active material layer can be formed in a uniform thickness. It is preferable that, in the wet granulated body, the aggregated particles of the conductive material are in a state where the structure of the aggregated particles is formed to some extent in an appropriate range. The reason for this is that the solvent can be held in the wet granulated body due to the structure of the aggregated particles of the conductive material.

However, as the period of time required to mix the active material and the conductive material with each other through a dry process increases, the conductive material is strongly pressed by the active material for a longer period of time. As a result, as the period of time required to mix the active material and the conductive material with each other through a dry process increases, the amount of a cut portion of the linkage in the structure of the aggregated particles of the conductive material increases. That is, in a case where the active material and the conductive material are mixed with each other through a dry process, the conductive material is in a state where the solvent cannot be appropriately held in the aggregated particles.

In the wet granulated body, a portion of the solvent, which cannot be held in the aggregated particles of the conductive material, is present outside of the aggregated particles of the conductive material. Further, in the film forming step, in a case where a wet granulated body having a large amount of solvent present outside of the aggregated particles of the conductive material is used, the formed electrode mixture sheet may also be attached to a roll having a slower moving speed of the outer circumferential surface after passing through the facing position of the two rolls. Therefore, the positive electrode sheet in which the positive electrode active material layer having a uniform thickness is formed on the surface of the positive electrode current collector foil may not be manufactured.

On the other hand, in the embodiment, the second mixing step of mixing the active material and the conductive material with each other through a dry process is performed within a short period of time. Therefore, in the embodiment, the wet granulated body can be formed while maintaining the aggregated particles of the conductive material in a state where the structure thereof is appropriately formed. Thus, in the wet granulated body, the solvent can be appropriately held in the aggregated particles of the conductive material. As a result, the electrode mixture sheet having passed through the facing position of the two rolls can be appropriately attached to a roll having a faster moving speed of the outer circumferential surface. Thus, in the embodiment, the positive electrode sheet which includes the positive electrode active material layer having a uniform thickness can be manufactured.

Second Embodiment

Next, a second embodiment will be described. Even in the second embodiment, the lithium ion secondary battery to be manufactured is the same as that in the first embodiment. In addition, even in the second embodiment, the wet granulated body is formed, and the positive electrode sheet is manufactured by performing the film forming step using the wet granulated body. However, the second embodiment is different from the first embodiment in the procedure of forming the wet granulated body.

Figure 6:
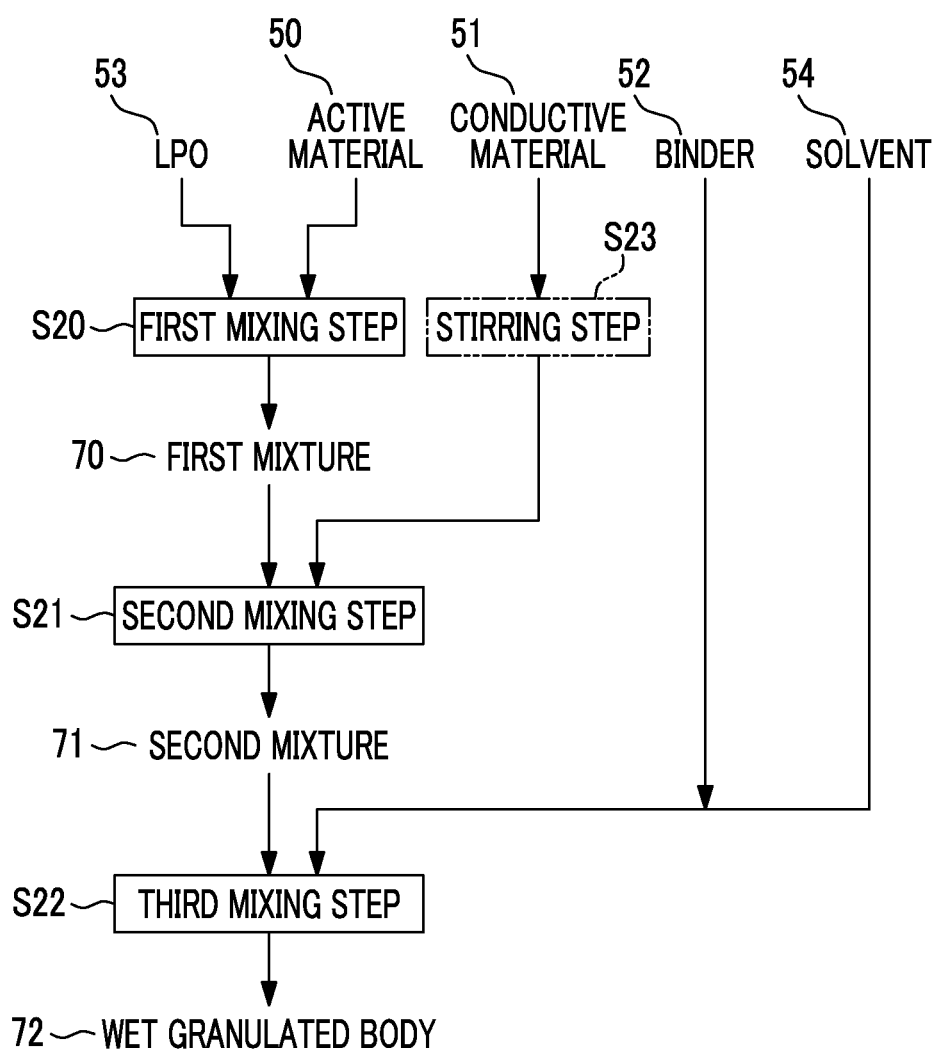
FIG. 6 is a flowchart showing the procedure of forming a wet granulated body according to a second embodiment.

FIG. 6 shows the procedure of forming a wet granulated body 72 according to the embodiment. Even in the second embodiment, in order to form the wet granulated body 72, the active material 50, the conductive material 51, the binder 52, and the LPO 53 are used. In addition, even in the second embodiment, as shown in FIG. 6, not only the positive electrode materials but also the solvent 54 are used to form the wet granulated body 72. That is, the materials used for forming the wet granulated body 72 even in the second embodiment are the same as those in the first embodiment.

In the embodiment, the wet granulated body 72 is formed by performing a first mixing step (S20), a second mixing step (S21), and a third mixing step (S22) shown in FIG. 6. In the first mixing step (S20), the second mixing step (S21), and the third mixing step (S22) according to the embodiment, the stirring device 1 shown in FIG. 4 can be used. Roughly, a difference between the second embodiment and the first embodiment is a timing when the active material 50 and the conductive material 51 are put into the stirring device 1.

That is, in the second embodiment, first, as shown in FIG. 6, the first mixing step (S20) is performed using the active material 50 and the LPO 53. Specifically, powder of the active material 50 and powder of the LPO 53 are put into the stirring tank 10 of the stirring device 1 and are stirred. That is, even in the second embodiment, the first mixing step is performed through a dry process. Due to this stirring, the active material 50 and the LPO 53 are uniformly stirred, and thus a first mixture 70 is manufactured as shown in FIG. 6.

Therefore, the first mixture 70 is obtained by uniformly mixing the active material 50 and the LPO 53 with each other.

Next, as shown in FIG. 6, the second mixing step (S21) is performed. In the second mixing step, the first mixture 70 is mixed with the conductive material 51. Specifically, powder of the conductive material 51 is put into the stirring tank 10 of the stirring device 1 after the first mixing step, and the components are stirred. That is, even in the second embodiment, the second mixing step is performed through a dry process. In the second mixing step, the first mixture 70 and the conductive material 51 are uniformly mixed with each other to manufacture a second mixture 71. Therefore, the second mixture 71 includes the active material 50, the conductive material 51, and the LPO 53. The second mixture 71 is formed by uniformly mixing the active material 50, the conductive material 51, and the LPO 53 with each other.

The powder of the conductive material 51 used in the second mixing step (S21) according to the second embodiment is prepared before the second mixing step and is stirred in a stirring step (S23). In the stirring step (S23), a portion of the linkage in the structure of the aggregated particles of the conductive material 51 is cut such that the aggregated particles of the conductive material 51 can be made to have an appropriate size which is suitable for forming the positive electrode active material layer 142. Therefore, in a case where the aggregated particles having an appropriate size for forming the positive electrode active material layer 142 are prepared as the powder of the conductive material 51, the stirring step (S23) is unnecessary.

Next, as shown in FIG. 6, the third mixing step (S22) is performed. In the third mixing step, the second mixture 71 is mixed with the binder 52 and the solvent 54. Specifically, the binder 52 and the solvent 54 are put into the stirring tank 10 of the stirring device 1 after the second mixing step, and the components are stirred. Even in the second embodiment, a binder solution in which the binder 52 and the solvent 54 are mixed with each other in advance is put into the stirring device 1. Therefore, even in the second embodiment, the third mixing step is performed through a wet process. In the third mixing step, the second mixture 71, the binder 52, and the solvent 54 are uniformly mixed with each other to form the wet granulated body 72. Therefore, the wet granulated body 72 includes the active material 50, the conductive material 51, the binder 52, the LPO 53, and the solvent 54 which are uniformly mixed with each other.

Even in the second embodiment, in the third mixing step, low-speed stirring and high-speed stirring are performed. Due to the low-speed stirring, a wet granulated body having coarse particles is formed while uniformly mixing the active material 50, the conductive material 51, the binder 52, the LPO 53, and the solvent 54 with each other in the mixture. Further, by performing the high-speed stirring at a faster circumferential speed of the stirring blades 20 than the low-speed stirring, the wet granulated body having coarse particles which is formed by the low-speed stirring is crushed to obtain the wet granulated body 72 having fine particles. As a result, in the third mixing step, the wet granulated body 72 having an appropriate particle size for forming the positive electrode active material layer 142 is formed.

Even in the second embodiment, it is preferable that a solid content ratio in the wet granulated body 72 is in a range of 65% to 95%. The reason for this is as follows. As in the first embodiment, in the above-described range, the wet granulated body 72 can be appropriately formed.

In addition, even in the second embodiment, the positive electrode sheet 140 is manufactured by performing the film forming step using the wet granulated body 72 obtained as described above. Even in the second embodiment, in the film forming step, the film forming device 200 shown in FIG. 4 can be used as in the first embodiment. Even in the second embodiment, the battery 100 can be manufactured using the positive electrode sheet 140 manufactured in the film forming step.

In the second embodiment, in the procedure of forming the wet granulated body, the first mixing step is performed before the second mixing step. In the first mixing step according to the second embodiment, the active material and the LPO are mixed to manufacture the first mixture in which the active material and the LPO are uniformly mixed. That is, before the second mixing step, the first mixture in which the active material and the LPO are uniformly mixed is prepared.

Therefore, even in the second embodiment, the second mixing step can be performed within a short period of time. Since the active material and the LPO are uniformly mixed with each other in the first mixture, the first mixture and the conductive material can be uniformly mixed with each other within a short period of time. Even in the second embodiment, by performing the second mixing step of mixing the active material and the conductive material through a dry process within a short period of time, the formation of a composite between the active material and the conductive material can be prevented.

As a result, even in the second embodiment, the amount of the conductive material contributing to the formation of a conductive path between the active material particles in the positive electrode active material layer can be made to be sufficient, and a conductive path can be favorably formed between the active material particles. Therefore, even in the second embodiment, the internal resistance of the manufactured battery can be reduced. Accordingly, the battery having excellent input and output characteristics can be manufactured.

In addition, even in the second embodiment, in the first mixing step, the LPO is uniformly dispersed in the first mixture. As a result, the LPO is also uniformly dispersed in the second mixture manufactured in the second mixing step and in the wet granulated body formed in the third mixing step. Further, the LPO is also uniformly distributed in the positive electrode active material layer which is formed using the wet granulated body. Therefore, even in the second embodiment, in a case where hydrofluoric acid (HF) is produced by the oxidative decomposition of the electrolytic solution, the produced hydrofluoric acid reacts with the LPO, which is uniformly distributed in the positive electrode active material layer, so as to be appropriately handled.

Accordingly, using the method according to the embodiment, the lithium ion secondary battery having excellent input and output characteristics in which the LPO is appropriately distributed in the active material layer of the positive electrode sheet can be manufactured.

Further, in the second embodiment, the second mixing step of mixing the active material and the conductive material with each other through a dry process is performed within a short period of time. As a result, the wet granulated body can be formed while maintaining the aggregated particles of the conductive material in a state where the structure thereof is appropriately formed. Thus, in the wet granulated body, the solvent can be appropriately held in the aggregated particles of the conductive material. As a result, the electrode mixture sheet having passed through the facing position of the two rolls can be appropriately attached to a roll having a faster moving speed of the outer circumferential surface. Thus, even in the second embodiment, the positive electrode sheet which includes the positive electrode active material layer having a uniform thickness can be manufactured.

EXAMPLES

Next, Examples according to the first embodiment or the second embodiment and Comparative Examples will be described. First, in Examples and Comparative Examples, positive electrode sheets were prepared using different examples. Further, lithium ion secondary batteries were prepared using the prepared positive electrode sheets. The lithium ion secondary batteries according to Examples and Comparative Examples were prepared using the same method and the same components including the negative electrode sheet and the like except for the positive electrode sheet.

The materials such as an active material used for the preparation of the positive electrode sheets according to Examples are shown below.
Active material: $LiNi_{1/2}Mn_{3/2}O_4$
Conductive material having an average particle size of 50 μm: AB having an average particle size of 0.1 to 1 μm
Binder: PVdF
Additive: LPO having an average particle size of 3 μm
Solvent: NMP
In addition, proportions of the positive electrode materials in Examples are shown below.
Active material: 88.8 wt %
Conductive material: 7.9 wt %
Binder: 1.5 wt %
Additive: 1.8 wt %
In Examples, a binder solution in which the binder and the solvent were prepared in advance was used. The content of the binder in the binder solution was 5 wt %.

Table 1 below shows the details of methods of preparing the positive electrode sheets according to Examples and Comparative Examples. In Table 1, the circumferential speed of the stirring blade and the mixing time are shown only regarding the mixing step which was performed through a dry process.

TABLE 1

Figure 7:
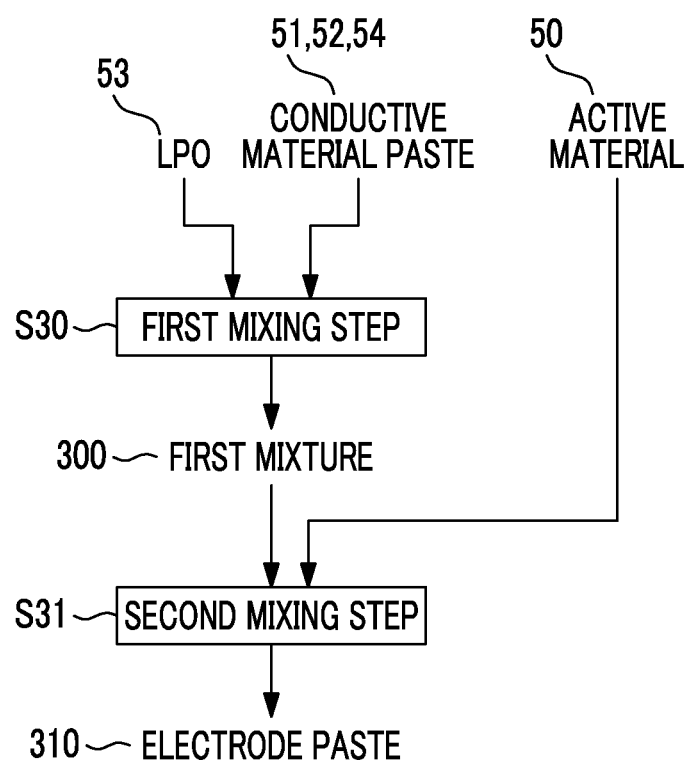
FIG. 7 is a flowchart showing the procedure of preparing an electrode paste according to a comparative example.
Figure 8:
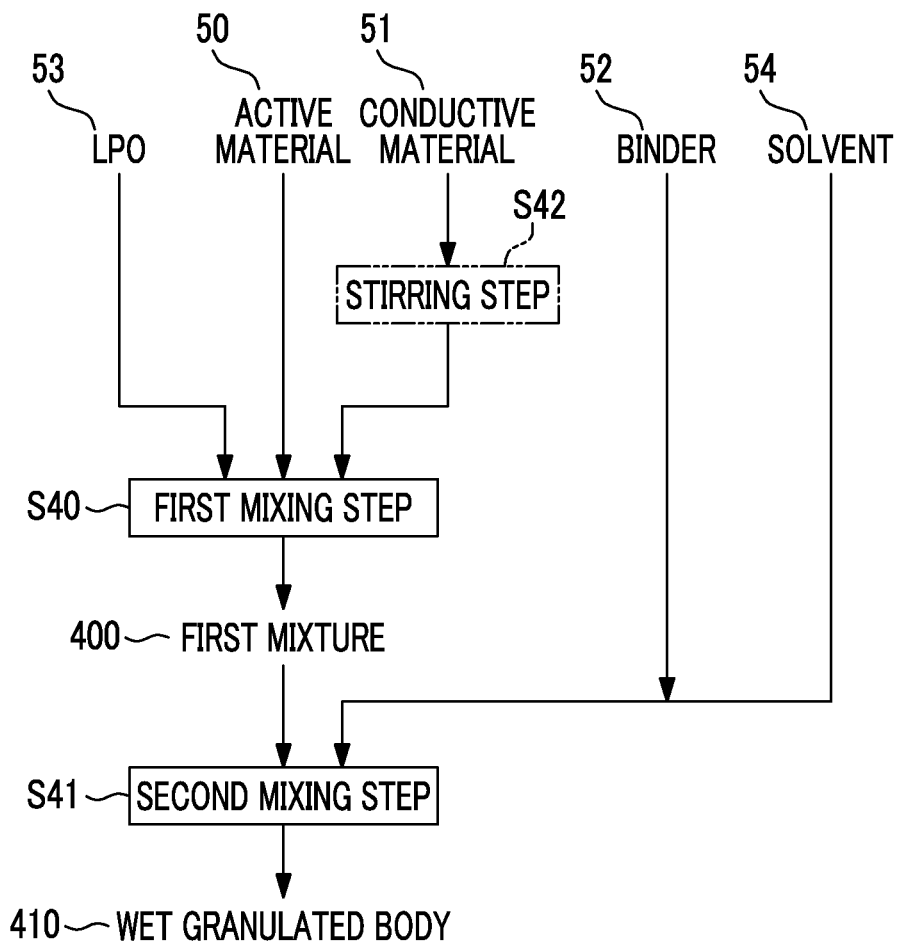
FIG. 8 is a flowchart showing the procedure of forming a wet granulated body according to a comparative example.
Figure 9:
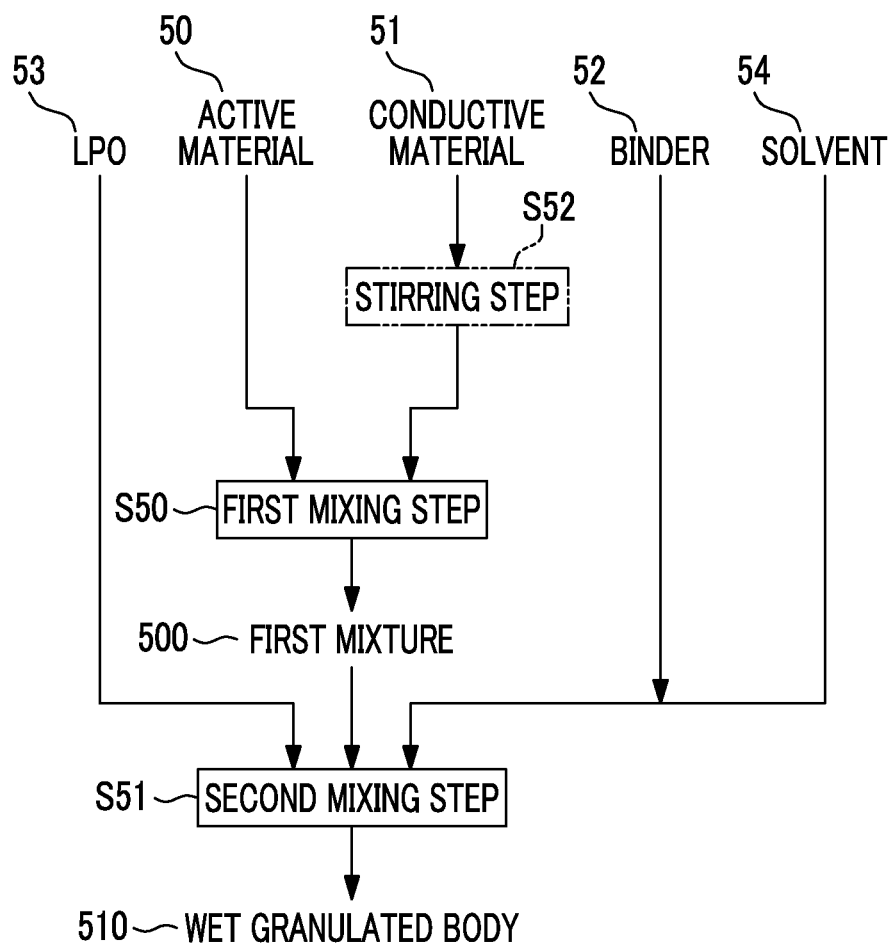
FIG. 9 is a flowchart showing the procedure of forming a wet granulated body according to a comparative example different from that shown in FIG. 8.

| | Method of Forming Wet Granulated Body | First Mixing Step | | Second Mixing Step | |
|---|---|---|---|---|---|
| | | Circumferential Speed [m/s] | Time [sec] | Circumferential Speed [m/s] | Time [sec] |
| Example 1 | FIG. 3 (First Embodiment) | 30 | 15 | 30 | 5 |
| Example 2 | FIG. 3 (First Embodiment) | 20 | 15 | 30 | 5 |
| Example 3 | FIG. 3 (First Embodiment) | 10 | 15 | 30 | 5 |
| Example 4 | FIG. 3 (First Embodiment) | 30 | 10 | 30 | 5 |
| Example 5 | FIG. 6 (Second Embodiment) | 30 | 15 | 30 | 5 |
| Comparative Example 1 | FIG. 7 (Paste Method) | — | — | — | — |
| Comparative Example 2 | FIG. 8 | 30 | 5 | — | — |
| Comparative Example 3 | FIG. 9 | 30 | 5 | — | — |

As shown in Table 1, in each of Examples 1 to 4, the wet granulated body 62 was formed in the procedure shown in FIG. 3 according to the first embodiment, and the positive electrode sheet was prepared in the film forming step using the wet granulated body 62. In Example 5, the wet granulated body 72 was formed in the procedure shown in FIG. 6 according to the second embodiment, and the positive electrode sheet was prepared in the film forming step using the wet granulated body 72. In Examples 1 to 5, the stirring device 1 shown in FIG. 4 was used to form the wet granulated body, and the film forming device 200 shown in FIG. 5 was used in the film forming step. As shown in Table 1, in Examples 1 to 5, the second mixing step was performed within a shorter period of time than in the first mixing step.

In Comparative Example 1, unlike the above-described embodiments, a positive electrode sheet was prepared using a paste method in which an electrode paste was used. That is, in Comparative Example 1, an electrode paste 310 was prepared in the procedure shown in FIG. 7, this electrode paste 310 was applied to a current collector foil, and a solvent was removed by drying from the electrode paste 310. As a result, the positive electrode sheet was prepared. During the preparation of the electrode paste, as shown in FIG. 7, first, a first mixing step (S30) of preparing a first mixture 300 by mixing powder of the LPO 53 with a conductive material paste was performed. The conductive material paste was prepared in advance by mixing the powder of the conductive material 51 with the binder solution (including the binder 52 and the solvent 54). Further, by performing a second mixing step (S31) of mixing powder of the active material 50 with the first mixture 300, the electrode paste 310 was prepared. In Comparative Example 1, materials such as an active material used to prepare the electrode paste 310 were the same as in Examples. However, in Comparative Example 1, the positive electrode materials were not appropriately distributed in the electrode paste 310. Therefore, a dispersant was added to the conductive material paste.

In Comparative Example 2, a wet granulated body 410 was formed in the procedure shown in FIG. 8, and a positive electrode sheet was prepared in the film forming step using the wet granulated body 410. During the preparation of the wet granulated body 410, as shown in FIG. 8, first, a first mixing step (S40) of preparing a first mixture 400 by mixing powders of the active material 50, the conductive material 51, and the LPO 53 with each other through a dry process was performed. Further, by performing a second mixing step (S41) of mixing the first mixture 400 with the binder solution (including the binder 52 and the solvent 54), the wet granulated body 410 was prepared. In Comparative Example 2, as shown in FIG. 8, the aggregated particles having a size which was adjusted to be appropriate for forming the positive electrode active material layer in a stirring step (S42) was used as the powder of the conductive material 51 in the first mixing step (S40).

In Comparative Example 3, a wet granulated body 510 was formed in the procedure shown in FIG. 9, and a positive electrode sheet was prepared in the film forming step using the wet granulated body 510. During the preparation of the wet granulated body 510, as shown in FIG. 9, first, a first mixing step (S50) of preparing a first mixture 500 by mixing powders of the active material 50 and the conductive material 51 with each other through a dry process was performed. Further, by performing a second mixing step (S51) of mixing the first mixture 500 with powder of the LPO 53 and the binder solution (including the binder 52 and the solvent 54), the wet granulated body 510 was prepared. In Comparative Example 3, as shown in FIG. 9, the aggregated particles having a size which was adjusted to be appropriate for forming the positive electrode active material layer in a stirring step (S52) was used as the powder of the conductive material 51 in the first mixing step (S50).

Even in Comparative Examples 2 and 3, the same materials such as an active material as in Examples were used. Further, even in Comparative Examples 2 and 3, the proportions of the positive electrode materials were the same as in Examples. Further, even in Comparative Examples 2 and 3, as in Examples, the stirring device 1 shown in FIG. 4 was used to form the wet granulated body, and the film forming device 200 shown in FIG. 5 was used in the film forming step.

In addition, in each of Examples and Comparative Examples, the prepared positive electrode sheet was laminated together with a negative electrode sheet and separators to prepare an electrode body, and this electrode body was accommodated in an battery case together with an electrolytic solution. As a result, a lithium ion secondary battery was prepared.

Regarding the positive electrode sheets and the lithium ion secondary batteries which were prepared using methods according to Examples and Comparative Examples, three evaluation items of an internal resistance value, a dispersion index value, and the number of defects generated were evaluated and compared to each other. Table 2 below shows the results of evaluating the respective evaluation items.

TABLE 2

| | Internal Resistance Value [mΩ] | Dispersion Index Value (vs. Comparative Example 1) | Number of Defects Generated |
|---|---|---|---|
| Example 1 | 1.9 | 0.98 | None |
| Example 2 | 1.9 | 1.00 | None |
| Example 3 | 2.2 | 1.14 | None |
| Example 4 | 2.1 | 1.04 | None |
| Example 5 | 1.9 | 1.18 | None |
| Comparative Example 1 | 2.6 | 1.00 | None |
| Comparative Example 2 | 2.1 | 1.37 | Generated (2) |
| Comparative Example 3 | 2.2 | 1.48 | Generated (5) |

The internal resistance value was measured regarding each of the lithium ion secondary batteries according to Examples and Comparative Examples.

The dispersion index value is a value indicating the degree to which the LPO was dispersed in the positive electrode active material layer of the positive electrode sheet. In order to calculate the dispersion index value, a cut surface which was cut from the positive electrode sheet in the thickness direction was analyzed using an electron probe microanalyzer (EPMA) to detect phosphorus (P). Next, the detection intensities of phosphorus (P) obtained from plural detection positions in the section of the positive electrode sheet were mapped to create image data, this image data was divided into plural sections, and a standard deviation of the detection intensities in the plural divided sections was calculated. The dispersion index value was calculated by calculating a ratio of the standard deviation of phosphorus (P), which was obtained in each of the positive electrode sheets according to Examples and Comparative Examples, to the standard deviation of phosphorus (P) obtained in the positive electrode sheet according to Comparative Example 1.

Here, the detection intensity obtained by EPMA increases as the amount of phosphorus (P) present as a detection target in the detection position increases. In addition, a material including phosphorus (P) among the positive electrode materials included in the positive electrode active material layer was only LPO. Thus, the dispersion index value which was calculated in each of the positive electrode sheets according to Examples and Comparative Examples was a value indicating the degree to which the LPO was dispersed in the positive electrode active material layer. In addition, as the dispersion index value decreases, the LPO is more uniformly dispersed in the positive electrode active material layer.

Regarding the number of defects generated, each of the positive electrode active material layers of the positive electrode sheets according to Examples and Comparative Examples was observed, a portion which was not formed in a uniform thickness due to a pin hole or stripe unevenness was set as a defect, and the number of defects was counted.

As shown in Table 2, in the positive electrode sheet according to Comparative Example 1, the dispersion index value was low, and the number of defects generated was 0. That is, in Comparative Example 1, no defects were observed in the positive electrode active material layer, and the positive electrode sheet in which the LPO was appropriately distributed in the positive electrode active material layer was able to be prepared. However, in Comparative Example 1, the internal resistance value of the lithium ion secondary battery was high. In Comparative Example 1, a dispersant was added to appropriately disperse the positive electrode materials in the electrode paste. This dispersant was not a conductive material. Therefore, it is thought that the presence of the dispersant increased the resistance of the positive electrode active material layer.

In the method of forming the active material layer in which the electrode paste was used as in Comparative Example 1, the costs required to manufacture the positive electrode sheet were higher than in the other methods in which the wet granulated body was used. For example, the reason for this is as follows. An expensive kneader is required to prepare the electrode paste. In addition, the amount of the solvent present in the electrode paste was large, and a large-sized and expensive drying furnace is required to dry the solvent.

In Comparative Examples 2 and 3, the internal resistance values of the lithium ion secondary batteries were reduced. However, in the positive electrode sheets of Comparative Examples 2 and 3, the dispersion index values were high. That is, in Comparative Examples 2 and 3, a deviation was generated in the distribution of the LPO in the positive electrode active material layer.

In the methods according to Comparative Examples 2 and 3, in order to eliminate the deviation in the distribution of the LPO, it was necessary to perform the first mixing step for a longer period of time. However, in the first mixing step of Comparative Examples 2 and 3, the active material and the conductive material were mixed with each other through a dry process. Therefore, in the methods according to Comparative Examples 2 and 3, as the mixing time of the first mixing step was increased, the amount of a composite of the active material and the conductive material was increased, and the internal resistance value of the lithium ion secondary battery was increased. Therefore, it can be seen that, in the methods according to Comparative Examples 2 and 3, it is difficult to appropriately distribute the LPO in the positive electrode active material layer of the positive electrode sheet, to reduce the internal resistance value of the lithium ion secondary battery, and to improve input and output characteristics.

Further, in the methods according to Comparative Examples 2 and 3, as the mixing time of the first mixing step of mixing the active material and the conductive material with each other through a dry process was increased, the linkage in the structure of the aggregated particles of the conductive material was cut. That is, the amount of the solvent held in the conductive material of the wet granulated body was small. Therefore, in the methods according to Comparative Examples 2 and 3, as the mixing time of the first mixing step was increased, the number of defects generated in the positive electrode sheet was increased.

On the other hand, in all of Examples 1 to 5, the internal resistance values of the lithium ion secondary batteries were reduced. Further, in the positive electrode sheets according to Examples 1 to 5, the dispersion index value was low, and the number of defects generated was 0. The reason for this is as follows. As described above, in Examples 1 to 5, in the first mixing step before the second mixing step, the first mixture in which the LPO was appropriately dispersed was prepared. In Examples 1 to 5, by performing the second mixing step within a short period of time, the formation of a composite of the active material and the conductive material was prevented. Further, by performing the second mixing step within a short period of time, the wet granulated body was able to be formed while maintaining the aggregated particles of the conductive material in a state where the structure thereof was appropriately formed. It was found that, in the methods according to Examples 1 to 5, the LPO can be appropriately distributed in the positive electrode active material layer of the positive electrode sheet, the internal resistance value of the lithium ion secondary battery can be reduced, and input and output characteristics can be improved.

In Examples 1 to 4 according to the first embodiment, the dispersion index value was lower than in Example 5 according to the second embodiment. Here, in general, the powders of the conductive material and the LPO are formed of fine particles having a smaller particle size than the powder of the active material and are difficult to disperse in the mixture. In Examples 1 to 4 according to the first embodiment and Example 5 according to the second embodiment, the first mixing step was performed for a longer period of time than in the second mixing step. In the first mixing step, the active material and the conductive material are not mixed with each other through a dry process and may not form a composite. Therefore, the first mixing step can be performed for a long period of time. In Examples 1 to 4 according to the first embodiment, in the first mixing step, the conductive material, which was difficult to disperse, and the LPO were mixed with each other for a long period of time. As a result, the conductive material and the LPO were able to be uniformly dispersed in the first mixture. Further, in Examples 1 to 4 according to the first embodiment, even in a case where the mixing time in the second mixing step was short, the active material was able to be uniformly dispersed in the first mixture, and the second mixture in which the materials were uniformly dispersed was able to be obtained. On the other hand, in Example 5 according to the second embodiment, the conductive material which was difficult to disperse was mixed with the first mixture in the second mixing step in which the mixing time was short. Therefore, in Example 5 according to the second embodiment, in the second mixing step, the materials were not able to be uniformly dispersed in the second mixture as compared to Examples 1 to 4 according to the first embodiment. As a result, in Examples 1 to 4 according to the first embodiment, the materials were able to be more uniformly dispersed in the wet granulated body formed in the third mixing step as compared to Example 5 according to the second embodiment. Accordingly, it is thought that, in the Examples 1 to 4 according to the first embodiment, the dispersion index values were reduced to be lower than in Example 5 according to the second embodiment. Thus, in the method according to the first embodiment, the positive electrode sheet in which the LPO is more appropriately distributed in the positive electrode active material layer can be manufactured as compared to the method according to the second embodiment.

Further, in a case where a production line is configured by providing different devices separately for the first mixing step, the second mixing step, and the third mixing step, in the method according to the second embodiment, it is necessary that a device which performs the first mixing step is larger and more expensive than that in the method according to the first embodiment. In the positive electrode materials used to form the positive electrode active material layer, the proportion of the active material was higher than that of the conductive material. Therefore, the amount of the powder of the active material used in the first mixing step according to the second embodiment was more than the amount of the powder of the conductive material used in the first mixing step according to the first embodiment. In the second embodiment, the stirring step of crushing the conductive material in advance may be performed. On the other hand, in the first embodiment, the conductive material can also be crushed in the first mixing step. That is, in the production line according to the second embodiment, a device which performs the stirring step for the conductive material is necessary as compared to the production line according to the first embodiment. Therefore, in a case where a production line is configured by providing different devices separately for the first mixing step, the second mixing step, and the third mixing step, in the method according to the second embodiment, in the method according to the first embodiment, a lithium ion secondary battery can be manufactured at a lower cost than in the method according to the second embodiment.

It can be seen that, in Examples 1 and 2 among Examples 1 to 4 according to the first embodiment, the positive electrode sheet having a particularly low dispersion index value was able to be prepared. In Examples 1 and 2, the first mixing step was performed by rotating the stirring blades at a circumferential speed of 20 msec or faster for 15 sec or longer. On the other hand, in Example 3, the circumferential speed of the stirring blades in the first mixing step was slow at lower than 20 msec. In addition, in Example 4, the mixing time of the first mixing step was shorter than 15 sec.

Therefore, it is thought that, in the methods according to Examples 1 and 2, the LPO was able to be more uniformly dispersed in the first mixture in the first mixing step than in the methods according to Examples 3 and 4. Therefore, it is thought that, in Examples 1 and 2, in the third mixing step after the first mixing step, the wet granulated body in which the LPO was more uniformly dispersed was able to be obtained. In Examples 1 and 2, by using the wet granulated body, the lithium ion secondary battery including the positive electrode sheet in which the LPO was more appropriately distributed in the positive electrode active material layer was able to be manufactured. As a result, the following can be seen that it is preferable to perform the first mixing step according to the first embodiment by rotating the stirring blades at a circumferential speed of 20 msec or faster for 15 sec or longer.

As described above in detail, the lithium ion secondary battery according to any one of the embodiments includes the positive electrode sheet. In addition, the positive electrode sheet is manufactured using the first mixing step, the second mixing step, the third mixing step, and the film forming step. In the first mixing step, the first mixture is prepared by mixing the powder of one of the active material and the conductive material with the powder of trilithium phosphate In the second mixing step, the second mixture is prepared by mixing the first mixture with the powder of the other one of the active material and the conductive material which is not used in the first mixing step. In the third mixing step, the wet granulated body is formed by mixing the second mixture with the binder and the solvent. In the film forming step, the active material layer is formed by attaching the wet granulated body to the surface of the current collector foil. As a result, the positive electrode sheet is manufactured. In the first mixing step, trilithium phosphate is appropriately dispersed in the first mixture. As a result, the second mixing step can be performed within a short period of time. Thus, the mixing time in the second mixing step of mixing the active material and the conductive material with each other through a dry process can be reduced. Accordingly, the formation of a composite of the active material and the conductive material can be prevented, and deterioration in the conductivity of the positive electrode active material layer can be prevented. In the first mixing step, trilithium phosphate is appropriately dispersed in the first mixture. As a result, in the wet granulated body formed in the third mixing step, trilithium phosphate can be appropriately dispersed. Further, in the film forming step, the wet granulated body in which trilithium phosphate is appropriately dispersed is used. As a result, the positive electrode active material layer in which trilithium phosphate is appropriately distributed can be formed. A method of manufacturing a lithium ion secondary battery can having excellent input and output characteristics can be realized in which trilithium phosphate is appropriately distributed in an active material layer of an electrode sheet.

The embodiments are merely exemplary and do not limit the disclosure. Accordingly, the embodiments can be improved and modified in various ways within a range not departing from the scope of the disclosure. For example, the shape of the wound electrode body is not limited to a flat shape, but a wound electrode body having a cylindrical shape can also be used. In addition, for example, the embodiments can be applied not only a wound electrode body but also a laminate electrode body. The materials such as the active material, the conductive material, and the binder described in the above-described embodiments are merely exemplary, and other examples can also be used.

What is claimed is:

1. A manufacturing method of a lithium ion secondary battery which includes an electrode sheet including an active material layer and a current collector foil,
   the active material layer including an active material, a conductive material, and a binder,
   the current collector foil having a surface on which the active material layer is provided,
   the manufacturing method comprising:
   forming a first mixture by mixing powder of a first electrode material, which is the conductive material, with powder of trilithium phosphate;
   forming a second mixture by mixing the first mixture with powder of a second electrode material, which is the active material; wherein the first mixture and the second mixture are formed by performing the mixing through a dry process;
   forming a wet granulated body by mixing the second mixture with the binder and a solvent, wherein the wet granulated body is configured by particles and a ratio of a weight of a solid content to a total weight of the wet granulated body is 65% to 95%; and
   forming the active material layer by applying the wet granulated body to the surface of the current collector foil,
   wherein, when forming the wet granulated body, a first stirring and a second stirring are performed,
   the first stirring is performed by rotating a stirring blade at a predetermined circumferential speed,
   the second stirring is performed by rotating the stirring blade at a faster circumferential speed than in the first stirring, and
   during the first stirring, coarse particles are formed, and during the second stirring, the coarse particles are crushed to form fine particles.

2. The manufacturing method according to claim 1, wherein
   when forming the first mixture, the powder of the first electrode material is mixed by rotating a stirring blade at a circumferential speed of 20 msec or faster for 15 sec or longer.

3. The manufacturing method according to claim 1, wherein
   the binder is polyvinylidene fluoride, and
   the solvent is N-methylpyrrolidone.

4. The manufacturing method according to claim 1, further comprising shaping the wet granulated body into a sheet prior to forming the active material layer.

5. The manufacturing method according to claim 1, wherein the particles of the wet granulated body contain the first electrode material, trilithium phosphate, the second electrode material, the binder and the solvent.

6. The manufacturing method according to claim 1, wherein the particles of the wet granulated body consist of the first electrode material, trilithium phosphate, the second electrode material, the binder and the solvent.

* * * * *